United States Patent
Kim et al.

(10) Patent No.: US 12,197,672 B2
(45) Date of Patent: Jan. 14, 2025

(54) METHOD OF ADJUSTING RECOGNITION SENSITIVITY FOR TOUCH RECOGNITION AND ELECTRONIC DEVICE FOR PERFORMING THE SAME

(71) Applicant: SAMSUNG ELECTRONICS CO., LTD., Suwon-si (KR)

(72) Inventors: Seonghun Kim, Suwon-si (KR); Kwangtaek Woo, Suwon-si (KR); Ganghyun Goo, Suwon-si (KR); Changho Lee, Suwon-si (KR); Jaeho Choi, Suwon-si (KR); Jinwan An, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/235,634

(22) Filed: Aug. 18, 2023

(65) Prior Publication Data
US 2023/0393683 A1    Dec. 7, 2023

Related U.S. Application Data

(63) Continuation of application No. PCT/KR2023/002487, filed on Feb. 21, 2023.

(30) Foreign Application Priority Data

Feb. 25, 2022  (KR) ........................ 10-2022-0025174
Apr. 29, 2022  (KR) ........................ 10-2022-0053722
Feb. 7, 2023   (KR) ........................ 10-2023-0016164

(51) Int. Cl.
*G06F 3/041*  (2006.01)
*G06V 40/13*  (2022.01)

(52) U.S. Cl.
CPC ............ *G06F 3/0416* (2013.01); *G06V 40/13* (2022.01)

(58) Field of Classification Search
CPC ........................................ G06V 40/13
See application file for complete search history.

(56) References Cited

U.S. PATENT DOCUMENTS

2011/0254761 A1 * 10/2011 Reigneau ............... G06F 3/042
                                                    345/156
2015/0002479 A1 *  1/2015 Kawamura ........... G06F 3/0485
                                                    345/178

(Continued)

FOREIGN PATENT DOCUMENTS

KR      20100051454 A    5/2010
KR      20120097002 A    9/2012

(Continued)

OTHER PUBLICATIONS

International Search Report for International Application No. PCT/KR2023/002487; International Filing Date Feb. 21, 2023; International Search Report Mail Date May 26, 2023; 4 Pages.

*Primary Examiner* — Nitin Patel
*Assistant Examiner* — Amen W Bogale
(74) *Attorney, Agent, or Firm* — CANTOR COLBURN LLP

(57) ABSTRACT

A method of adjusting recognition sensitivity for a touch recognition and an electronic device performing the method are disclosed. The electronic device includes a touch interface including a touch screen and configured to measure a current change value of a touch sensing electrode by a touch input of a user, a sensor, and a processor, and the processor is configured to control to obtain first information corresponding to the current change value through the touch interface and second information corresponding to a touch area value of the touch input through the sensor, in response (Continued)

to the touch input, and adjust a threshold value for a touch recognition based on the first information and the second information.

14 Claims, 7 Drawing Sheets

(56) References Cited

U.S. PATENT DOCUMENTS

| | | | |
|---|---|---|---|
| 2017/0205944 A1* | 7/2017 | Kim | G06V 40/1306 |
| 2020/0089857 A1* | 3/2020 | Xu | G06V 40/12 |
| 2020/0175143 A1* | 6/2020 | Lee | G06F 3/0446 |
| 2020/0201476 A1* | 6/2020 | Shiomi | G06F 3/04186 |
| 2021/0333923 A1* | 10/2021 | Matsubara | G06F 1/169 |
| 2021/0373739 A1* | 12/2021 | Li | G06F 3/041661 |
| 2021/0400048 A1* | 12/2021 | Liem | H04L 67/535 |

FOREIGN PATENT DOCUMENTS

| | | |
|---|---|---|
| KR | 20150020774 A | 2/2015 |
| KR | 101521925 B1 | 5/2015 |
| KR | 101651733 B1 | 8/2016 |
| KR | 101721533 B1 | 3/2017 |
| KR | 20170067355 A | 6/2017 |
| KR | 20190111623 A | 10/2019 |
| KR | 102110183 B1 | 5/2020 |
| KR | 20200110786 A | 9/2020 |
| KR | 20200119620 A | 10/2020 |
| KR | 102275700 B1 | 7/2021 |
| WO | 2018230875 A1 | 12/2018 |

\* cited by examiner

METHOD OF ADJUSTING RECOGNITION SENSITIVITY FOR TOUCH RECOGNITION AND ELECTRONIC DEVICE FOR PERFORMING THE SAME

CROSS-REFERENCE TO RELATED APPLICATIONS

This application is a continuation application of International Application No. PCT/KR2023/002487, designating the United States, filed on Feb. 21, 2023, in the Korean Intellectual Property Receiving Office and claiming priority to Korean Patent Application No. 10-2022-0053722, filed on Feb. 25, 2022, Korean Patent Application No. 10-2022-0053722, filed on Apr. 29, 2022, and Korean Patent Application No 10-2023-0016164, filed on Feb. 7, 2023, in the Korean Intellectual Property Office, the disclosures of which are incorporated by reference herein in their entireties.

BACKGROUND

1. Field

The disclosure relates to technology for adjusting recognition sensitivity of a touch input.

2. Description of Related Art

An electronic device including a touch screen may receive a touch input of a user through the touch screen. The electronic device may recognize a touch input when a touch intensity value obtained through the touch screen is greater than or equal to a threshold value.

SUMMARY

According to an embodiment, an electronic device includes a touch interface including a touch screen and configured to measure a current change value of a touch sensing electrode by a touch input of a user, a sensor, and a processor. The processor is configured to control to obtain first information corresponding to the current change value through the touch interface and second information corresponding to a touch area value of the touch input through the sensor, in response to the touch input, and adjust a threshold value for a touch recognition based on the first information and the second information.

According to an embodiment, an electronic device includes a touch interface including a touch screen and configured to measure a current change value of a touch sensing electrode by a touch input of a user, a fingerprint sensor, and a processor. The processor is configured to control to obtain an output signal from the touch interface corresponding to the current change value and an output signal from the fingerprint sensor, in response to the touch input, and adjust a threshold value for a touch recognition based on the output signal from the touch interface and the output signal from the fingerprint sensor.

According to an embodiment, an electronic device includes a touch interface including a touch screen and configured to measure a current change value of a touch sensing electrode by a touch input of a user and a processor. The processor is configured to control to obtain first information corresponding to the current change value based on an output signal from the touch interface and second information corresponding to a touch area value of the touch input, in response to the touch input, and adjust a threshold value for a touch recognition based on the first information and the second information.

According to an embodiment, a method of adjusting recognition sensitivity for a touch recognition includes, in response to a touch input of a user on a touch screen of an electronic device, obtaining first information corresponding to a current change value of a touch sensing electrode through a touch interface of the electronic device, obtaining second information corresponding to a touch area value of the touch input through a sensor of the electronic device in response to the touch input, and adjusting a threshold value for a touch recognition based on the first information and the second information.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
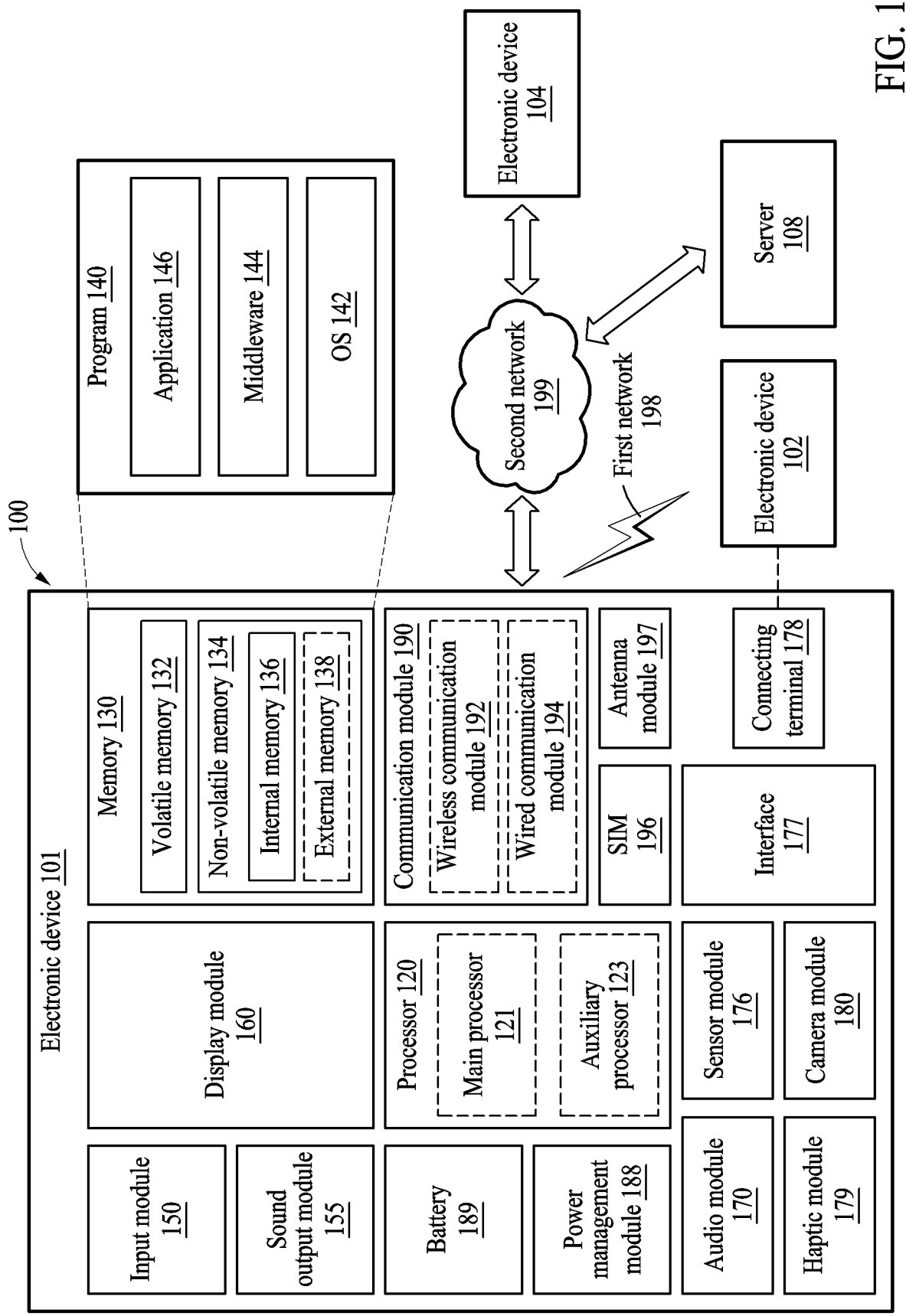
FIG. 1 is a block diagram illustrating an electronic device in a network environment according to an embodiment.

Hereinafter, an embodiment will be described in detail with reference to the accompanying drawings. When describing an embodiment with reference to the accompanying drawings, like reference numerals refer to like elements and a repeated description related thereto will be omitted.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the above components may be omitted from the electronic device 101, or one or more other components may be added to the electronic device 101. In an embodiment, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. The display module 160 may include a touch sensor that senses a touch input of a user and/or a pressure sensor that measures an intensity of a force incurred by the touch input. According to an embodiment, the display module 160 may include a touch interface (e.g., a touch interface 620 of FIG. 6 and a touch interface 710 of FIG. 7) including a touch screen and configured to measure a current change value of a touch sensing electrode by a touch input of a user. The current change value of the touch sensing electrode may correspond to, for example, a change value of capacitance between touch sensing electrodes spaced from one another.

The audio module 170 may convert a sound into an electric signal and vice versa. According to an embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor (e.g., a fingerprint sensor), a temperature sensor, a humidity sensor, or an illuminance sensor. The fingerprint sensor among biometric sensors may obtain a fingerprint image obtained by capturing a fingerprint area of a user. In an embodiment, the fingerprint sensor may be a fingerprint on display (FoD) sensor (or under display fingerprint sensor). The FoD sensor may be below the touch sensing electrode of the touch interface and may have a structure overlapping with the touch sensing electrode. The FoD sensor may capture a fingerprint area of a user from a touch input of the user that is touched on the touch screen. The FoD sensor may operate in an ultrasonic method that scans a fingerprint using ultrasonic waves or in an optical method in which light output from a light source scans reflected light that is reflected on a fingerprint.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
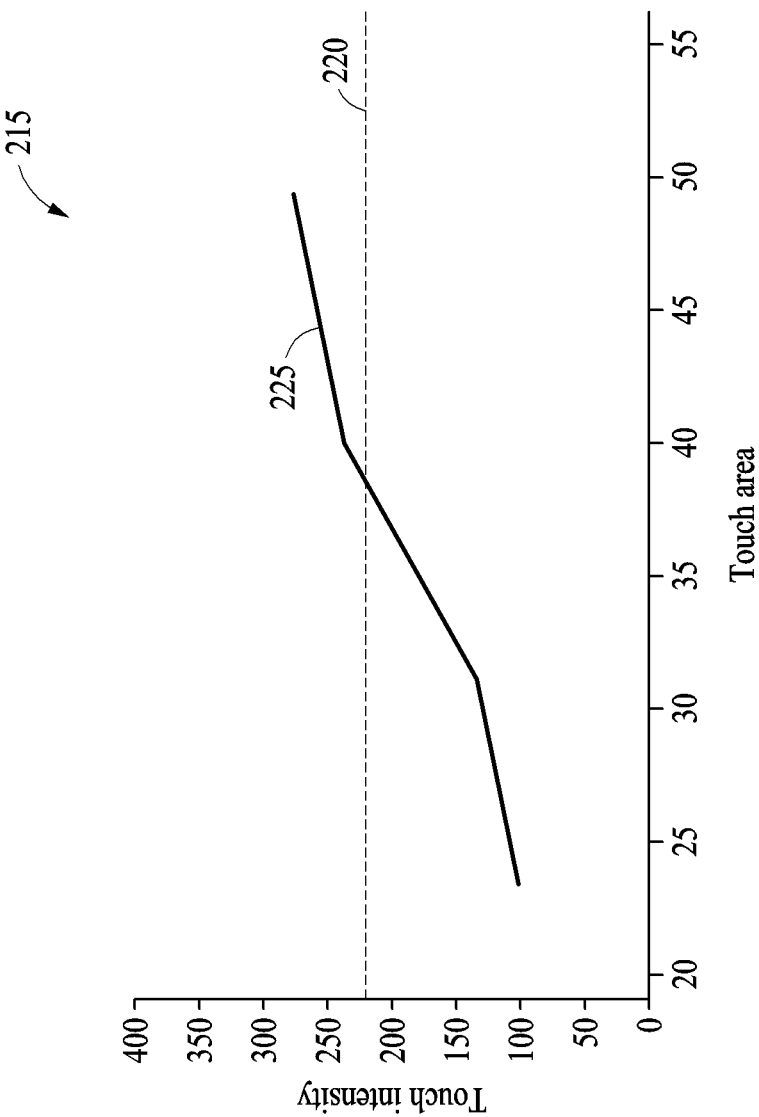
FIG. 2 is a diagram illustrating a touch intensity value of a touch input obtained through a touch screen of an electronic device and a threshold value for a touch input recognition according to an embodiment.
Figure 2:
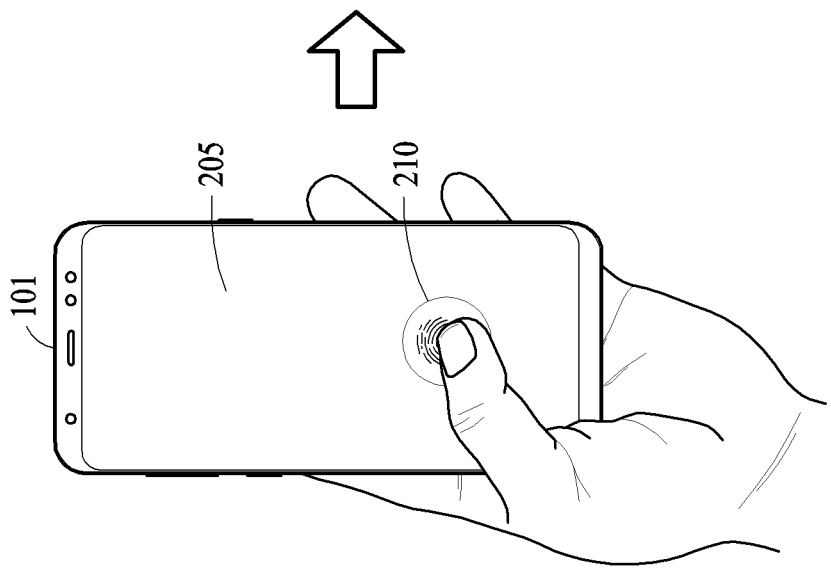

FIG. 2 is a diagram illustrating a touch intensity value of a touch input obtained through a touch screen (or a touch interface) of an electronic device and a threshold value for a touch input recognition according to an embodiment.

The electronic device 101 according to an embodiment may include a touch screen 205 that receives a touch input of a user and a fingerprint sensor (not shown) that obtains a fingerprint. The touch screen 205 may be included, for example, in the touch interface of the display module 160 of FIG. 1. The fingerprint sensor may be included, for example, in the sensor module 176 of FIG. 1. The fingerprint sensor may be disposed in a partial area (e.g., an area 210) below the touch screen 205 with respect to a surface of the touch screen 205. For example, the fingerprint sensor may be an FoD sensor and may be below the touch sensing electrode of the touch interface.

The electronic device 101 may obtain a touch intensity value of a touch input of a user through the touch screen 205. The touch intensity value may correspond to, for example, a current change value (or a change value of capacitance formed between touch sensing electrodes) of a touch sensing electrode by the touch input of the user. The electronic device 101 may recognize that the touch input is input when the obtained touch intensity value is greater than or equal to a threshold value set for the touch screen 205. The threshold value is a value for a touch recognition, and when it is determined that the current change value of the touch sensing electrode by the touch input of the user is greater than or equal to the threshold value, the touch input of the user may be recognized as being input.

As shown in FIG. 2, a user may touch the area 210 where the fingerprint sensor is disposed on the touch screen 205. In an embodiment, when receiving a touch input through the area 210 where the fingerprint sensor is disposed, the electronic device 101 may perform user authentication using fingerprint information (e.g., a fingerprint image) obtained through the fingerprint sensor. The electronic device 101 may determine that the user authentication is successful when the input fingerprint information matches fingerprint information of a registered user.

In an embodiment, the electronic device 101 may estimate a touch area value of a touch input through the fingerprint sensor in response to the touch input. For example, the electronic device 101 may obtain the touch area value from a fingerprint image obtained through the fingerprint sensor or may extract a long axis and a short axis from an elliptical shape corresponding to the touch input obtained through the fingerprint sensor and may estimate the touch area value (corresponding to an area value of an ellipse) based on the extracted long axis and the extracted short axis.

In an embodiment, the electronic device 101 may obtain a touch intensity value of a touch input that is input through the touch screen 205. For example, the electronic device 101 may obtain a current change value of a touch sensing electrode by the touch input of a user as the touch intensity value. The electronic device 101 may recognize the touch input when the touch intensity value exceeds a threshold value 220 set for the touch screen 205. The electronic device 101 may determine that a touch recognition for the touch input is successful when a signal value corresponding to the current change value measured by the touch sensing electrode is greater than the threshold value for the touch recognition.

Referring to FIG. 2, an example graph 215 of a touch intensity value according to a touch area value is shown. As illustrated, as the touch area value increases, a touch intensity value 225 of a touch input obtained through the touch screen 205 may increase. The electronic device 101 may recognize (or determine that a touch recognition of the touch input is successful) that the touch input is input when the obtained touch intensity value is greater than or equal to the threshold value 220 set for the touch recognition.

The touch intensity value obtained through the touch screen 205 may vary depending on a user. Depending on a user characteristic, the touch intensity value obtained through the touch screen 205 may be significantly greater or significantly less than a threshold value (e.g., deviation of 25% or more from the threshold value) set as a default value on the touch screen 205, in this case, a touch input of a user may not be properly recognized in the electronic device 101 or an erroneous operation may occur in relation to the touch input. Since permittivity at the time of a touch input may be different depending on a unique body characteristic of each user or a touch environment (e.g., ambient humidity or whether a finger is wet), a current change value of a touch sensing electrode measured at the time of the touch input may be different for each user. For example, even when the touch input is performed with the same touch area, the current change value of the touch sensing electrode of a person having higher permittivity than others may be measured to be higher and the current change value of the touch sensing electrode of a person having constitutionally lower permittivity than others may be measured to be lower. Accordingly, recognition sensitivity for a touch recognition may appear differently for each user, and for normal and natural touch recognition, it is appropriate to individually adjust the recognition sensitivity (or touch sensitivity) for the touch recognition for each user. The adjusting of the recognition sensitivity may be possible by adjusting a threshold value representing a minimum current change value of the touch sensing electrode to be recognized as a touch input.

A method of adjusting recognition sensitivity for a touch recognition described in an embodiment of the present disclosure and the electronic device 101 performing the method may set touch sensitivity to natural touch sensitivity for a user by adjusting a threshold value for a touch recognition to a value suitable for the user. The electronic device 101 may provide natural touch sensitivity to the user by automatically adjusting the threshold value for the touch recognition based on a touch intensity value and a touch area value obtained through the touch input, without the user directly setting the touch sensitivity.

Figure 3:
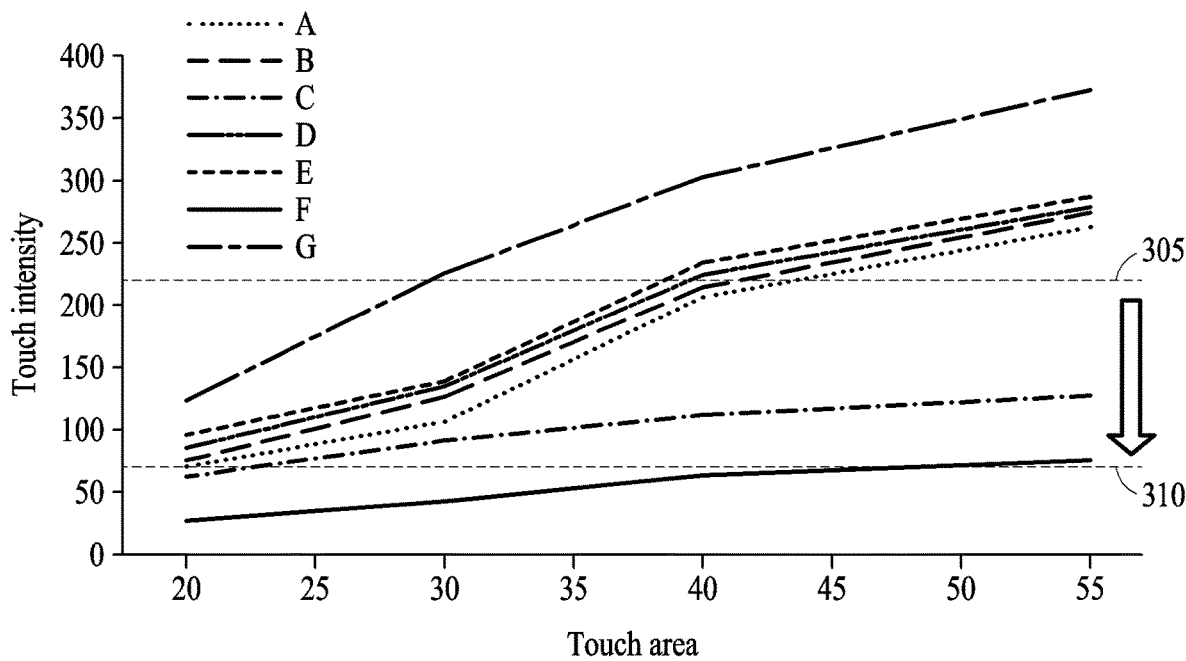
FIG. 3 is a diagram illustrating adjusting a touch intensity value according to a user characteristic and a threshold value for a touch recognition according to an embodiment.

FIG. 3 is a diagram illustrating adjusting a touch intensity value according to a user characteristic and a threshold value for a touch recognition according to an embodiment.

Referring to FIG. 3, when several users touch the touch screen 205 of the electronic device 101 using conductive rods having various areas (corresponding to a touch area), an example of a touch intensity value according to a touch area value is shown. For example, the touch intensity value may correspond to a current change value of a touch sensing electrode in a touch interface when a conductive rod touches the touch screen 205.

In the example of FIG. 3, A represents a touch intensity value of a touch input obtained through a touch interface when a first user touches the touch screen 205 using conductive rods having areas of "20" to "55" substantially. B to E represent touch intensity values of the touch input obtained through the touch interface when a second user touches the touch screen 205 using conductive rods having areas of "20" to "55" substantially but uses a different gripping method of the conductive rods. E and F represent touch intensity values of the touch input obtained through the touch interface when a third user touches the touch screen 205 using conductive rods having areas of "20" to "55" substantially but uses a different gripping method of the conductive rods. Here, the areas of "20" to "55" substantially represent relative areas of the conductive rods used to measure the touch intensity value.

In the example of FIG. 3, it may be assumed that a threshold value 305 of a current touch intensity value set in the electronic device 101 for a touch recognition is "215". In this case, when the first user and the second user touch the touch screen 205 with an area greater than or equal to "40" substantially, the electronic device 101 may recognize a touch input. However, since the touch intensity value obtained by the touch screen 205 does not exceed the threshold value 305 even though the third user touches with an area of "55" substantially, the electronic device 101 may not recognize a touch input of the third user. Assuming that the touch area by a finger of a person corresponds to "40", it is necessary to adjust the threshold value 305 currently set for a recognition of a complete touch input for the third user.

In an embodiment, the electronic device 101 may automatically adjust recognition sensitivity of a touch input for a user in response to the touch input of the user. The electronic device 101 may obtain a touch intensity value and a touch area value through the touch input of the user, determine whether the threshold value 305 for a touch recognition needs to be adjusted based on the obtained touch intensity value and the obtained touch area value, and set a new threshold value (e.g., a threshold value 310) based on the obtained touch intensity value and the obtained touch area value in response to a determination that an adjustment of the threshold value 305 is necessary.

In an embodiment, the electronic device 101 may obtain a touch intensity value using a touch interface including the touch screen 205 and may obtain a touch area value using a sensor (e.g., a fingerprint sensor) in response to a touch input of a user on the touch screen 205. The electronic device 101 may determine a threshold value for a touch recognition suitable for a user characteristic based on the touch intensity value and the touch area value for at least one touch input and may adjust the threshold value set for the touch screen 205 based on the determined threshold value. For example, the electronic device 101 may adjust (e.g., reduce) the threshold value for the touch recognition to the threshold value 310 of "60" based on the touch intensity value and the touch area value of the touch input of the third user. According to an embodiment, the electronic device 101 may set the threshold value for the touch recognition to a higher value than the threshold value 305 that is currently set, with respect to a user (e.g., a user who provides a higher touch sensitivity as a touch input) having a higher current change value of a touch sensing electrode even when touching with a small touch area.

Figure 4:
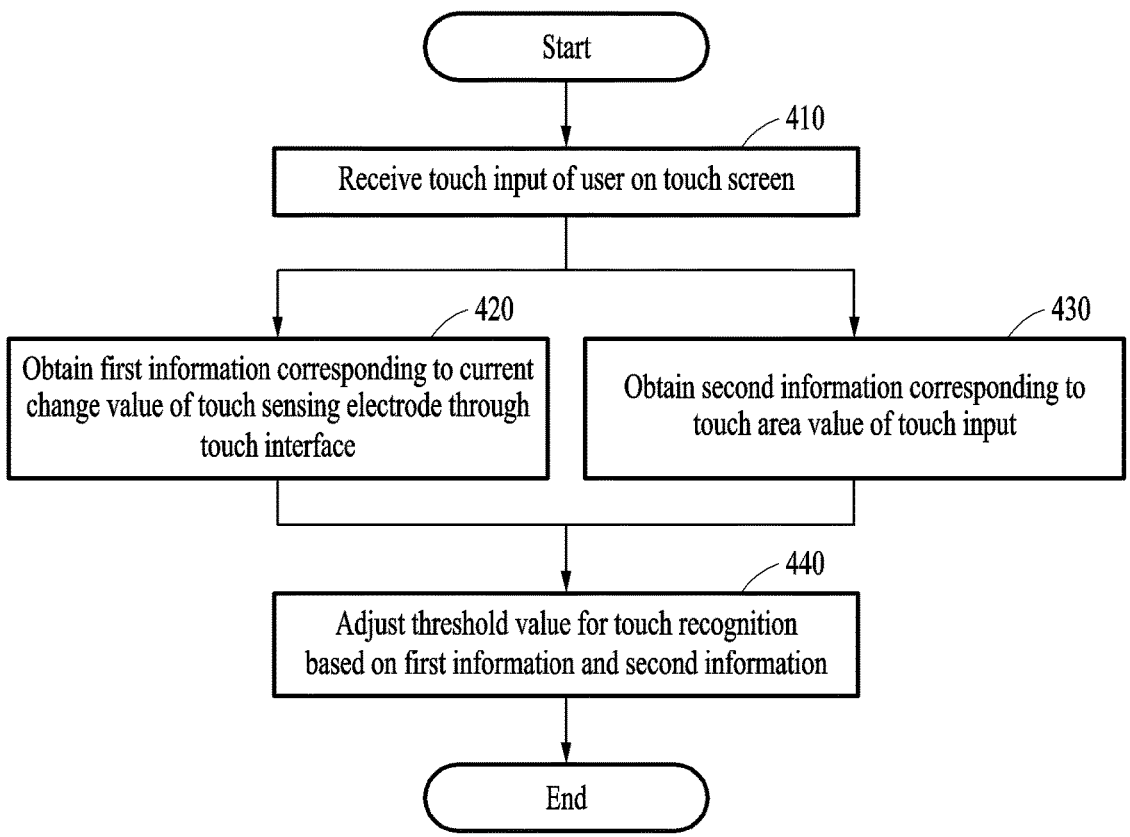
FIG. 4 is a flowchart illustrating a method of adjusting recognition sensitivity for a touch recognition according to an embodiment.

FIG. 4 is a flowchart illustrating a method of adjusting recognition sensitivity for a touch recognition according to an embodiment. A method of adjusting recognition sensitivity according to an embodiment may be performed by an electronic device (e.g., the electronic device 101 of FIG. 1).

Referring to FIG. 4, in operation 410, the electronic device 101 may receive a touch input of a user on the touch screen of the electronic device 101.

In operation 420, the electronic device 101 may obtain first information corresponding to a current change value of a touch sensing electrode through a touch interface (e.g., a touch interface 620 of FIG. 6) of the electronic device 101 in response to a touch input in operation 410. The first information corresponding to the current change value of the touch sensing electrode may be included in an output signal from the touch interface.

The touch interface may include a plurality of touch sensing electrodes for sensing a touch of a user under the touch screen. The touch interface may operate in a capacitive type that measures a change (corresponding to a change of capacitance) of the amount of charge of the touch sensing electrodes by a touch input according to a touch sensing method or may operate in a resistive type that measures a change of current of the touch sensing electrodes by the touch input. In the case of operating in the capacitive type, a current change value of the touch sensing electrode may correspond to a change value of capacitance by the touch input.

In operation 430, the electronic device 101 may obtain second information corresponding to a touch area value of a touch input through a sensor (e.g., a sensor 610 of FIG. 6 and a fingerprint sensor) of the electronic device 101 in response to a touch input in operation 410. The second information corresponding to a touch area value may be included in an output signal from the sensor. The second information corresponding to the touch area value may include the touch area value or may include information (e.g., parameters related to a shape of a touch area such as a long axis and a short axis of an ellipse or fingerprint images) for estimating the touch area value.

In operation 440, the electronic device 101 may adjust a threshold value for a touch recognition based on the first information obtained in operation 420 and the second information obtained in operation 430. In an embodiment, the electronic device 101 may convert a signal value corresponding to a current change value in the first information into a signal corresponding to a reference touch area value based on a touch area value of a touch input in the second information and may determine a target threshold value based on the signal value corresponding to the reference touch area value. In an embodiment, the electronic device 101 may determine the signal value corresponding to the reference touch area value for each of a plurality of touch inputs of a user and may determine the target threshold value based on the signal value corresponding to the reference touch area value. For example, an average value of the target threshold values determined for each of the plurality of touch inputs may be determined as a final target threshold value.

The electronic device 101 may estimate a touch intensity value for the reference touch area value based on the touch intensity value (e.g., a current change value of a touch sensing electrode) for a touch area value of the touch input received in operation 410 and may determine a target threshold value of a user based on the estimated touch intensity value. For example, the estimated touch intensity value may be determined as the target threshold value of the user. The electronic device 101 may adjust a threshold value for touch recognition of the user based on the determined target threshold value. For example, the electronic device 101 may change a current threshold value to a value close to the estimated touch intensity value as the target threshold value.

In an embodiment, the electronic device 101 may determine a target threshold value for a user based on a current change value and a touch area value and may determine whether to adjust the current threshold value based on the target threshold value and a current threshold value set for a touch recognition. The electronic device 101 may determine to adjust the current threshold value in response to the current threshold value being not in a reference range (e.g., a specific percentage range of the target threshold value (e.g., +/−5% and +/−10%, etc.)) based on the target threshold value. The electronic device 101 may adjust the current threshold value based on the target threshold value in response to determining to adjust the current threshold value. For example, the electronic device 101 may set the target threshold value as the current threshold value for the touch recognition. The electronic device 101 may determine to continuously maintain the current threshold value without adjusting the current threshold value in response to the current threshold value being in the reference range.

In an embodiment, the electronic device 101 may perform a process of adjusting recognition sensitivity for a touch recognition described in operations 410 to 440 whenever a touch input of a user is received or at a specific time point. Alternatively or additionally, the electronic device 101 may also perform a process of operations 410 to 440 after receiving a user command explicitly requesting a recognition sensitivity adjustment from the user.

Figure 5:
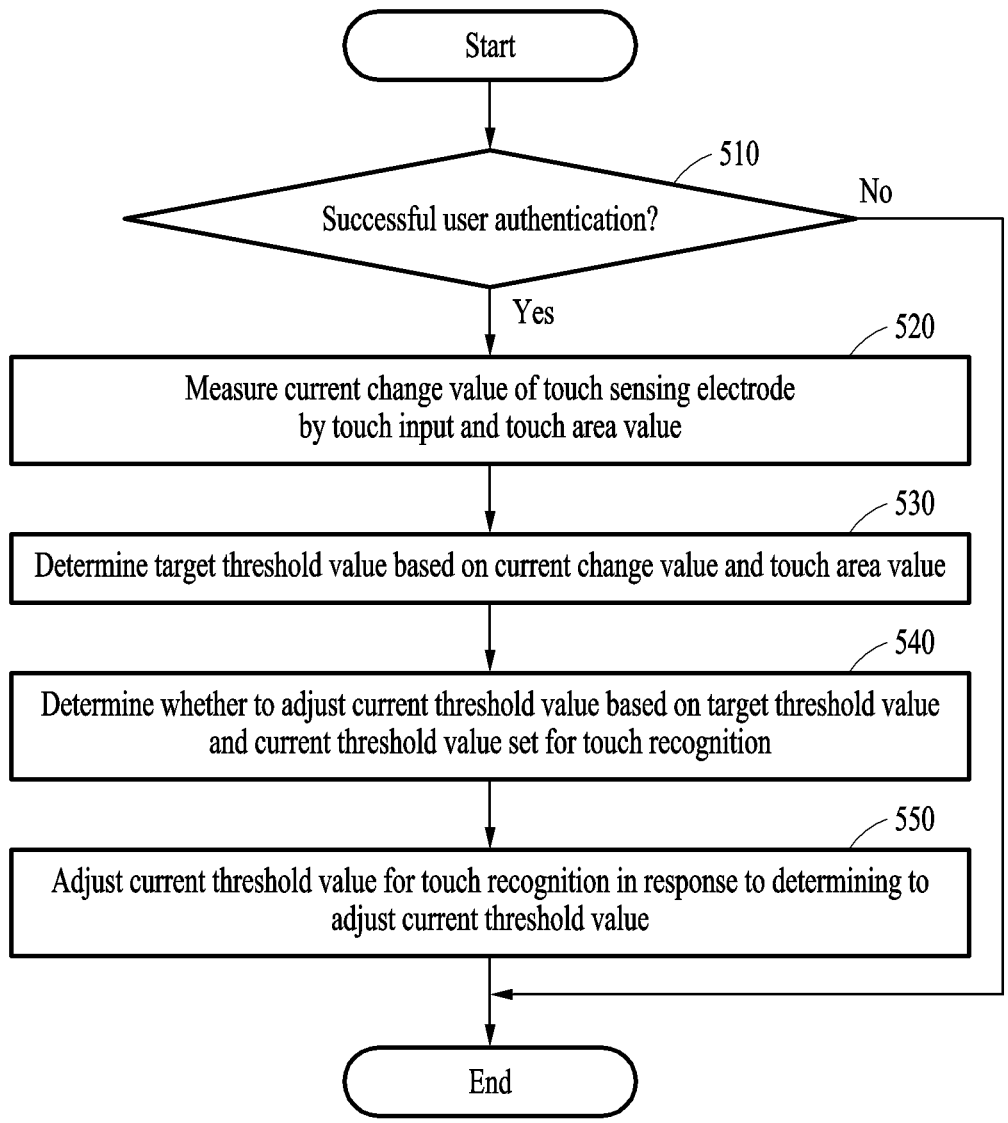
FIG. 5 is a flowchart illustrating a method of adjusting recognition sensitivity for a touch recognition according to an embodiment.

FIG. 5 is another flowchart illustrating a method of adjusting recognition sensitivity for a touch recognition according to an embodiment.

Referring to FIG. 5, in operation 510, the electronic device 101 may perform user authentication. For example, a user may touch an area (e.g., the area 210 of FIG. 2) where the fingerprint sensor is disposed on the touch screen 205 with a finger, and the electronic device 101 may perform the user authentication using the fingerprint sensor. The electronic device 101 may determine that the user authentication is successful when fingerprint information obtained through the fingerprint sensor matches fingerprint information of a registered user. However, this is only an example, and the electronic device 101 may perform the user authentication using various user authentication methods other than fingerprint authentication. For example, the electronic device 101 may perform the user authentication using biometric authentication such as face authentication and iris authentication.

When it is determined that the user authentication is successful ("yes" in operation 510), in operation 520, the electronic device 101 may measure a current change value of a touch sensing electrode by a touch input on the touch screen 205 and a touch area value. The current change value of the touch sensing electrode may correspond to a touch intensity value. In an embodiment, the current change value of the touch sensing electrode may be measured by the touch interface. The touch area value may be estimated from a signal obtained by the sensor (e.g., the fingerprint sensor) and/or the touch interface of the electronic device 101. For example, the electronic device 101 may estimate the touch area value from a fingerprint image obtained through the fingerprint sensor or may estimate the touch area value from a long axis and a short axis of an ellipse corresponding to a shape of the touch input estimated through the touch interface.

In operation 530, the electronic device 101 may determine a target threshold value for a touch recognition for a user based on the obtained current change value and touch area value. In an embodiment, the electronic device 101 may determine the current change value of the touch sensing electrode for each of the plurality of touch inputs and the target threshold value for the touch recognition based on the touch area value. For example, the electronic device 101 may determine an average value of the current change values (or values obtained by converting the current change values measured for the touch inputs into the current change value for a reference touch area value) measured for the plurality of touch inputs as the target threshold value. In an embodiment, to improve suitability of the target threshold value, the electronic device 101 may determine an average value of remaining values excluding at least one upper value and at least one lower value among the current change values measured for the plurality of touch inputs as the target threshold value, thereby reducing variability in the remaining values. For example, when the target threshold value is determined based on the current change values measured for "100" touch inputs, the electronic device 101 may determine an average value of "80" current change values excluding the top "10" current change values and the bottom "10" current change values as the target threshold value. According to an embodiment, to improve suitability of the target threshold value, the electronic device 101 may determine a median value of the current change values measured for the touch inputs as the target threshold value.

In an embodiment, the target threshold value may be a value corresponding to a reference touch area value. The reference touch area value may be a touch area value that is a reference for adjusting a threshold value for a touch recognition. The reference touch area value may be a preset value or may be manually or automatically set in various ways as needed. In an embodiment, the reference touch area value may be determined based on the touch area values of the plurality of touch inputs. For example, an average value or a median value of touch area values of the plurality of touch inputs may be determined as the reference touch area value. When the touch area value of the touch input does not correspond to the reference touch area value, the electronic device 101 may convert the current change value of the touch sensing electrode of the corresponding touch input into the current change value corresponding to the reference touch area value. In an embodiment, the conversion into the current change value corresponding to the reference touch area value may be performed based on a relationship defined between the touch area values obtained for the plurality of touch inputs of a user and the current change values of the touch sensing electrode. For example, when the current change value is measured as "150" when the touch area value is "30" and the current change value is measured as "250" when the touch area value is "50", the current change value for a reference touch area value "40" may be estimated as "200" by estimating the current change value according to the touch area value as a linear relationship.

In operation 540, the electronic device 101 may determine whether to adjust a current threshold value based on a target threshold value determined in operation 530 and a current threshold value set for a touch recognition.

In an embodiment, the electronic device 101 may determine whether to adjust a threshold value currently set for a touch recognition based on whether a current threshold value set for the touch recognition is in a set reference range (e.g., a standard deviation range of target threshold values set for a plurality of touch inputs) for a target threshold value. For example, the electronic device 101 may determine a standard deviation of a touch intensity value (e.g., a current change value of a touch sensing electrode) of the plurality of touch inputs used to determine the target threshold value. The electronic device 101 may determine not to adjust the threshold value currently set for the touch recognition when the threshold value set for the touch screen 205 is in the standard deviation range set for the touch intensity value of the plurality of touch inputs. The electronic device 101 may determine to adjust the threshold value currently set for the touch recognition when the threshold value set for the touch screen 205 is not in the standard deviation range set for the touch intensity value of the plurality of touch inputs. For example, the standard deviation range may refer to a standard deviation range such as two-sigma or three-sigma for the touch intensity value used to determine the target threshold value. The standard deviation range may be variously set as needed. In another example, the electronic device 101 may determine whether to adjust the threshold value set for the touch screen 205 based on whether the threshold value set for the touch screen 205 is in a specific percentage (e.g., +/−5% and +/−10%) of the touch intensity value of the plurality of touch inputs.

In response to a determining to adjust a current threshold value for a touch recognition, in operation 550, the electronic device 101 may adjust the current threshold value for the touch recognition. For example, the electronic device 101 may change the current threshold value to a target threshold value. The electronic device 101 may provide natural touch sensitivity suitable for a user characteristic by changing a threshold value for the touch recognition to the target threshold value.

Figure 6:
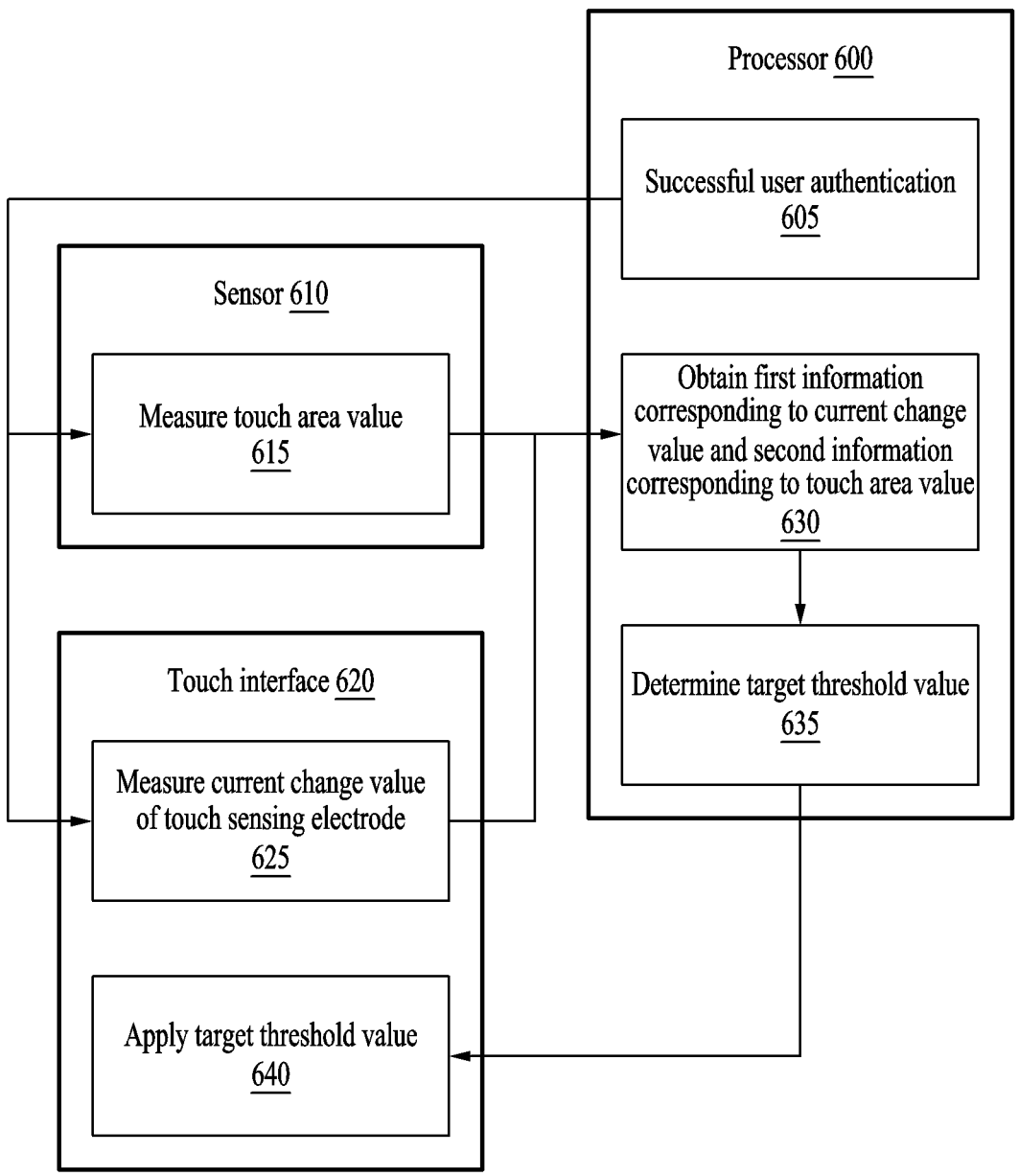
FIG. 6 is a diagram illustrating an operation of adjusting recognition sensitivity performed by a sensor, a touch interface, and a processor of an electronic device according to an embodiment.

FIG. 6 is a diagram illustrating an operation of adjusting recognition sensitivity performed by a sensor, a touch interface, and a processor of an electronic device according to an embodiment.

Referring to FIG. 6, the electronic device 101, according to an embodiment, including a touch interface 620 including a touch screen (e.g., the touch screen 205 of FIG. 2) and configured to measure a current change value of a touch sensing electrode by a touch input of a user, a sensor 610, and a processor 600 (e.g., the processor 120 of FIG. 1) is shown. For example, the sensor 610 may correspond to a fingerprint sensor that obtains a fingerprint (or a fingerprint image) when a user inputs a touch. The processor 600 may control a threshold value set for a touch recognition to be adjusted.

In an embodiment, in operation 605, the processor 600 may determine whether user authentication is successful, and in response to a determination that the user authentication is successful, may request a signal used to determine whether to adjust touch sensitivity of the sensor 610 and the touch interface 620. According to an embodiment, operation 605 may be omitted. In operation 615, the sensor 610 may obtain a touch area value by measuring the touch area value of a touch input. In operation 625, the touch interface 620 may measure a current change value (or a touch intensity value) of a touch sensing electrode by a touch input through the touch interface 620.

In an embodiment, the processor 600 may estimate a range of a touch input based on a range of a touch sensing electrode where the touch input is sensed from an output signal from the touch interface 620 and may estimate a long axis and a short axis for the estimated range (assumed to correspond to an elliptical shape) of the touch input. When the long axis and the short axis of the range of the touch input are estimated, the processor 600 may adjust the touch area value measured in operation 615 based on the corresponding long axis and short axis.

In an embodiment, the touch interface 620 may measure a pressure value of a touch input. For example, a current change value in a touch sensing electrode may vary according to the pressure value of the touch input. As the pressure value of the touch input increases in a specific range, the current change value in the touch sensing electrode may increase. When the pressure value of the touch input is obtained using the touch interface 620, the processor 600 may determine a target threshold value of a touch intensity value for the touch interface 620 based on the pressure value of the touch input, the current change value of the touch sensing electrode, and the touch area value.

In operation 630, the processor 600 may obtain the first information corresponding to the current change value from the touch interface 620 and the second information corresponding to the touch area value from the sensor 610. The processor 600 may store the first information corresponding to the obtained current change value and the second information corresponding to the touch area value in a memory (e.g., the memory 130 of FIG. 1). In operation 635, the processor 600 may determine a target threshold value for a touch recognition of a user based on a touch intensity value in the first information and a touch area value in the second information. Operation 635 may correspond to operation 530 of FIG. 5, and a detailed description thereof is omitted.

The processor 600 may determine whether to adjust a current threshold value for a touch recognition set for the touch interface 620 as shown in operation 540 of FIG. 5. In response to determining to adjust the current threshold value for the touch recognition, in operation 640, the processor 600 may change the current threshold value for the touch recognition set for the touch interface 620 to a target threshold value by controlling the touch interface 620 to apply the target threshold value to the touch recognition.

In an embodiment, a plurality of users who may use the electronic device 101 may be registered in the electronic device 101, for example, stored in memory 130. In this case, the processor 600 may control to perform adjusting a threshold value for a touch recognition for a user whose user authentication is successful among a plurality of users registered in the electronic device 101 according to the above-described process and store the adjusted threshold value.

Figure 7:
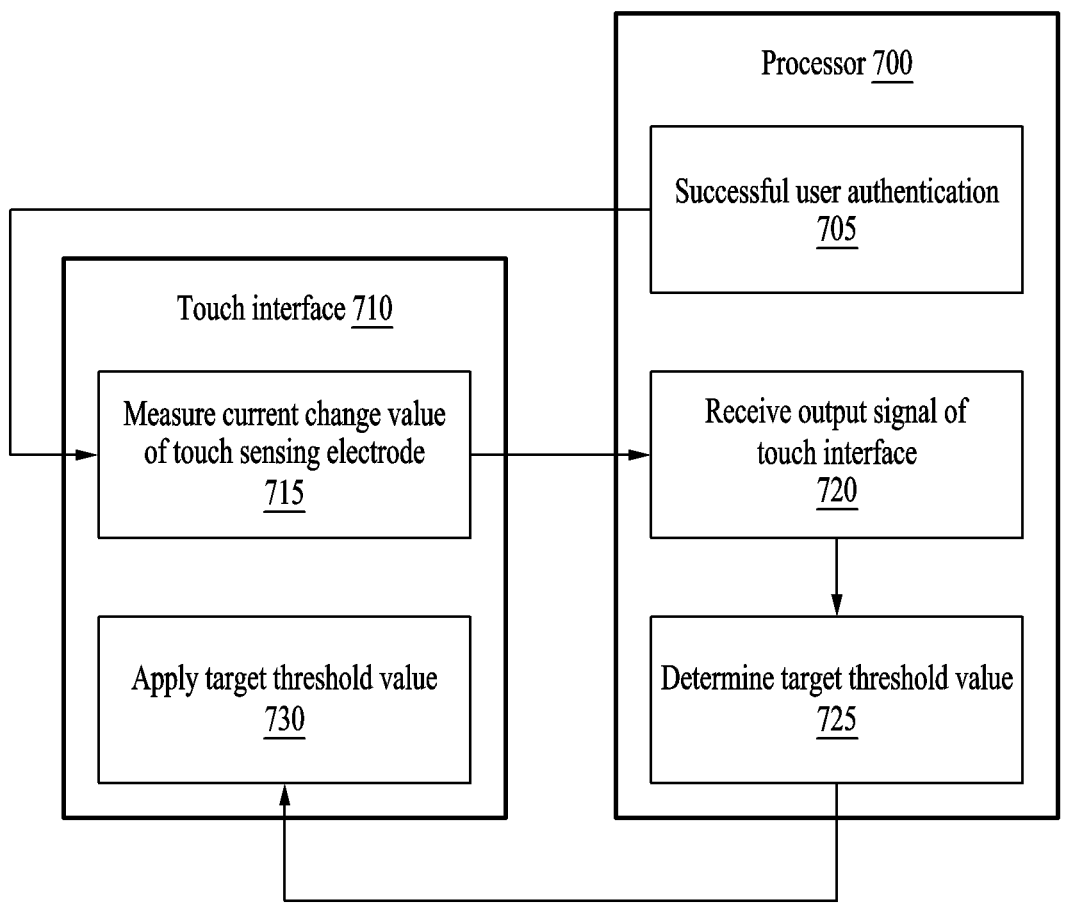
FIG. 7 is a diagram illustrating an operation of adjusting recognition sensitivity performed by a touch interface and a processor of an electronic device according to an embodiment.

FIG. 7 is a diagram illustrating an operation of adjusting recognition sensitivity performed by a touch interface and a processor of an electronic device according to an embodiment.

Referring to FIG. 7, the electronic device 101, according to an embodiment, including a touch interface 710 including a touch screen (e.g., the touch screen 205 of FIG. 2) and configured to measure a current change value of a touch sensing electrode by a touch input of a user and a processor 700 is shown. The processor 700 may be, for example, the processor 120 of FIG. 1 or a processor in a touch integrated chip (or a touch controller integrated circuit) of a touch interface.

In an embodiment, in operation 705, the processor 700 may determine whether user authentication is successful and may request a signal used to determine whether to adjust touch sensitivity of the touch interface 710 in response to a determination that the user authentication is successful. According to an embodiment, operation 705 may be omitted.

In operation 715, the touch interface 710 may measure a current change value of a touch sensing electrode in response to a touch input of a user. In operation 720, the processor 700 may receive an output signal from the touch interface 710. The processor 700 may obtain the first information corresponding to the current change value based on the output signal from the touch interface 710 and the second information corresponding to a touch area value of the touch input, in response to the touch input of the user. The processor 700 may determine the touch area value based on the current change value of the touch sensing electrode in the touch interface 710. In an embodiment, the processor 700 may estimate a range of the touch input based on a range of the touch sensing electrode where the touch input is sensed from the output signal from the touch interface 710 and may estimate a long axis and a short axis for the estimated range of the touch input (assumed to correspond to a shape of an ellipse). When the long axis and short axis of the range of the touch input are estimated, the processor 700 may determine the touch area value of the touch input based on the corresponding long axis and short axis.

The processor 700 may control to adjust a threshold value for a touch recognition based on the first information and the second information. In an embodiment, in operation 725, the processor 700 may determine a target threshold value for a user based on a current change value and a touch area value. The processor 700 may control to determine whether to adjust a current threshold value set for the touch recognition based on the target threshold value and the current threshold value set for the touch recognition. In operation 730, the processor 700 may change the current threshold value for the touch recognition set for the touch interface 620 by controlling the touch interface 710 to apply the target threshold value to the touch recognition in response to a determination to adjust the current threshold value for the touch recognition.

As above-described, the electronic device 101 according to an embodiment may adjust touch sensitivity for a touch recognition without using an output signal from a fingerprint sensor.

Figure 8:
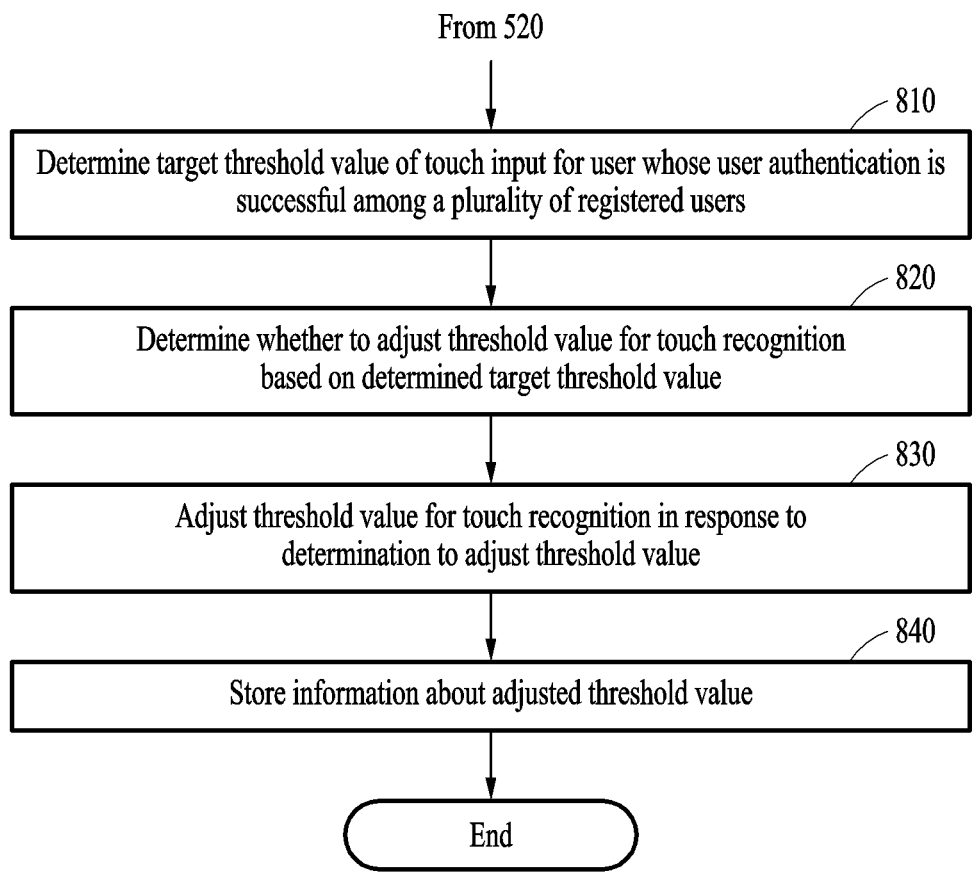
FIG. 8 is a flowchart illustrating an operation of adjusting a threshold value for a touch recognition for a plurality of users registered in an electronic device according to an embodiment.

FIG. 8 is a flowchart illustrating an operation of adjusting a threshold value for a touch recognition for a plurality of users registered in an electronic device according to an embodiment.

In an embodiment, there may be several users registered in the electronic device 101. The electronic device 101 may perform adjusting a threshold value for a touch recognition for a registered user whose user authentication is successful among a plurality of registered users and may store the adjusted threshold value.

When there are several users registered in the electronic device 101, in operation 810, the electronic device 101 may obtain a current change value of a touch sensing electrode and a touch area value in response to a touch input of a user whose user authentication is successful currently and uses the electronic device 101 and may determine a target threshold value of the touch input for the user whose user authentication is successful currently based on the obtained current change value and the touch area vale. The determination of the target threshold value is described in operation 530 of FIG. 5, and a duplicate description thereof is omitted.

In operation 820, the electronic device 101 may determine whether to adjust a threshold value for a touch recognition based on a target threshold value for the touch input of the user determined in operation 810. Whether to adjust the threshold value for the touch recognition is described in operation 540 of FIG. 5, and a duplicate description thereof is omitted.

In operation 830, the electronic device 101 may adjust a threshold value for a touch recognition in response to a determination to adjust the threshold value for the touch recognition. For example, the electronic device 101 may change the threshold value currently set for the touch recognition to a target threshold value. By changing the threshold value for the touch recognition to the target threshold value, the electronic device 101 may provide touch sensitivity suitable (or tailored) for a registered user whose user authentication is successful. According to an embodiment, the threshold value for the touch recognition is not changed for users other than the registered user whose user authentication is successful. However, it should be understood that the operations of FIG. 9 are individually applied to each of other registered users so that different registered users may have different threshold values.

In operation 840, the electronic device 101 may store information about the threshold value adjusted in operation 830 for a registered user whose user authentication is successful.

The electronic device 101 according to an embodiment may include the touch interface 620 including a touch screen and configured to measure a current change value of a touch sensing electrode by a touch input of a user, the sensor 610, and the processor 600. The current change value of the touch sensing electrode may correspond to a change value of capacitance by the touch input, for example. The processor 600 may obtain the first information corresponding to the current change value through the touch interface 620 and the second information corresponding to the touch area value of the touch input through the sensor 610 in response to the touch input.

In an embodiment, the processor 600 may control to obtain the first information corresponding to the current change value and the second information corresponding to the touch area value of the touch input in response to the user authentication being successful for the electronic device 101.

The processor 600 may control a threshold value to be adjusted for a touch recognition based on the first information and the second information. In an embodiment, the processor 600 may control to determine a target threshold value for a user based on a current change value of a touch sensing electrode and a touch area value and determine whether to adjust a current threshold value based on a target threshold value and the current threshold value set for the touch recognition.

In an embodiment, the processor 600 may control to convert a signal value corresponding to a current change value into a signal value corresponding to a reference touch area value based on a touch area value and determine a target threshold value based on the signal corresponding to the reference touch area value. In an embodiment, the processor 600 may control to determine signal values corresponding to the reference touch area value for each of a plurality of touch inputs of a user and determine the target threshold based on the signal values corresponding to the reference touch area value.

In an embodiment, the processor 600, in response to a current threshold value for a touch recognition being not in a reference range based on a target threshold value, may control to determine to adjust the current threshold value and determine not to adjust the current threshold value in response to the current threshold value being in the reference range. The processor 600 may control to adjust the current threshold value based on the target threshold value in response to determining to adjust the current threshold value. For example, the processor 600 may control to set the target threshold value as the current threshold value for the touch recognition.

In an embodiment, the processor 600 may control to perform adjusting a threshold value for a touch recognition for a user whose user authentication is successful among a plurality of users registered in the electronic device 101 and store the adjusted threshold value.

In an embodiment, the processor 600 may control to determine that the touch recognition of the touch input is successful when the signal value corresponding to the current change value of the touch sensing electrode is greater than the threshold value for the touch recognition.

The electronic device 101 according to an embodiment may include the touch interface 620 including a touch screen and configured to measure a current change value of a touch sensing electrode by a touch input of a user, the fingerprint sensor 610, and the processor 600. In an embodiment, the fingerprint sensor 610 may be below the touch sensing electrode and may have a structure overlapping with the touch sensing electrode. The processor 600 may obtain an output signal from the touch interface 620 corresponding to a current change value of a touch sensing electrode and an output signal from a fingerprint sensor in response to the touch input. The processor 600 may control to adjust a threshold value for a touch recognition based on the output signal from the touch interface 620 and the output signal from the fingerprint sensor 610.

In an embodiment, the processor 600 may control to determine a touch area value of a touch input based on the output signal from the fingerprint sensor 610, determine a target threshold value for a user based on the touch area value and a current change value of a touch sensing electrode, and determine whether to adjust the current threshold value based on the target threshold value and a current threshold value set for the touch recognition.

The electronic device 101, according to an embodiment, may include the touch interface 710 including a touch screen and configured to measure a current change value of a touch sensing electrode by a touch input of a user and the processor 700. In response to the touch input, the processor 700 may obtain the first information corresponding to the current change value of the touch sensing electrode and the second information corresponding to a touch area value of the touch input, based on the output signal from the touch interface 710. In an embodiment, the processor 700 may determine the touch area value based on the current change value of the touch sensing electrodes in the touch interface 710.

In an embodiment, the processor 700 may control to adjust the threshold value for the touch recognition based on the first information and the second information. The processor 700 may control to determine the target threshold value for a user based on the current change value and the touch area value and determine whether to adjust the current threshold value based on the target threshold value and the current threshold value set for the touch recognition.

A method of adjusting recognition sensitivity for a touch recognition according to an embodiment may include obtaining the first information corresponding to the current change value of the touch sensing electrode through the touch interface 620 of the electronic device 101 in response to a touch input of a user on the touch screen of the electronic device 101. The method may further include obtaining the second information corresponding to a touch area value of the touch input through the sensor 610 of the electronic device 101 in response to the touch input. The method may further include adjusting a threshold value for a touch recognition based on the first information and the second information. The method may further include determining a target threshold value for the user based on the current change value and the touch area value and determining whether to adjust the current threshold value based on the target threshold value and the current threshold value set for the touch recognition.

The electronic device according to an embodiment may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that an embodiment of the disclosure and the terms used therein is not intended to limit the technological features set forth herein to particular embodiments and includes various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "1st," "2nd," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a touch interface comprising a touch screen and configured to measure a current change value of a touch sensing electrode by a touch input of a user;
a sensor; and
a processor,
wherein the processor is configured to control to:
perform user authentication based on the touch input;
obtain first information corresponding to the current change value through the touch interface and second information corresponding to a touch area value of the touch input through the sensor, based on the result of performing the user authentication; and
adjust a threshold value for a touch recognition based on the first information and the second information.

2. The electronic device of claim 1, wherein the processor is configured to control to:
determine a target threshold value for the user based on the current change value and the touch area value; and
based on the target threshold value and a current threshold value set for the touch recognition, determine whether to adjust the current threshold value.

3. The electronic device of claim 2, wherein the processor is configured to control to convert a signal value corresponding to the current change value into a signal value corresponding to a reference touch area value based on the touch area value and determine the target threshold value based on the signal value corresponding to the reference touch area value.

4. The electronic device of claim 3, wherein the processor is configured to control to determine the signal value corresponding to the reference touch area value for each of a plurality of touch inputs of the user and determine the target threshold value based on the signal value corresponding to the reference touch area value.

5. The electronic device of claim 2, wherein the processor is configured to control to:
determine to adjust the current threshold value in response to the current threshold value not being in a reference range based on the target threshold value; and
determine not to adjust the current threshold value in response to the current threshold value being in the reference range.

6. The electronic device of claim 2, wherein the processor is configured to control to adjust the current threshold value based on the target threshold value in response to determining to adjust the current threshold value.

7. The electronic device of claim 1, wherein the processor is configured to control to perform adjusting the threshold value for the touch recognition for the user whose user authentication is successful among a plurality of users registered in the electronic device and store the threshold value having been adjusted.

8. The electronic device of claim 1, wherein the processor is configured to control to determine that the touch recognition for the touch input is successful when a signal value corresponding to the current change value is greater than the threshold value for the touch recognition.

9. An electronic device comprising:
a touch interface comprising a touch screen and configured to measure a current change value of a touch sensing electrode by a touch input of a user;
a fingerprint sensor; and
a processor,
wherein the processor is configured to control to:
perform user authentication based on the touch input;
obtain an output signal from the touch interface corresponding to the current change value and an output signal from the fingerprint sensor, in response to the touch input, based on the result of performing the user authentication;
adjust a threshold value for a touch recognition based on the output signal from the touch interface and the output signal from the fingerprint sensor.

10. An electronic device comprising:
a touch interface comprising a touch screen and configured to measure a current change value of a touch sensing electrode by a touch input of a user;
a sensor separate from the touch interface; and
a processor,
wherein the processor is configured to control to:
obtain first information corresponding to the current change value based on an output signal from the touch interface and second information corresponding to a touch area value of the touch input through the sensor, in response to the touch input; and
adjust a threshold value for a touch recognition based on the first information and the second information.

11. The electronic device of claim 10, wherein the processor is configured to control to:
determine the touch area value based on the current change value of the touch sensing electrode in the touch interface;
determine a target threshold value for the user based on the current change value and the touch area value; and
based on the target threshold value and a current threshold value set for the touch recognition, determine whether to adjust the current threshold value.

12. A method of adjusting recognition sensitivity for a touch recognition, the method comprising:
in response to a touch input of a user on a touch screen of an electronic device, obtaining first information corresponding to a current change value of a touch sensing electrode through a touch interface of the electronic device;
obtaining second information corresponding to a touch area value of the touch input through a sensor of the electronic device in response to the touch input, the sensor being separate from the touch interface; and
adjusting a threshold value for the touch recognition based on the first information and the second information.

13. The method of claim 12, further comprising:
determining a target threshold value for the user based on the current change value and the touch area value; and
based on the target threshold value and a current threshold value set for the touch recognition, determining whether to adjust the current threshold value.

14. A non-transitory computer-readable storage medium storing instructions that, when executed by a processor, cause the processor to perform the method of claim 12.

* * * * *